No. 894,792. PATENTED JULY 28, 1908.
G. ESCHELLMANN & A. HARMUTH.
APPARATUS FOR ABSORPTION OF GASES.
APPLICATION FILED JULY 27, 1907.
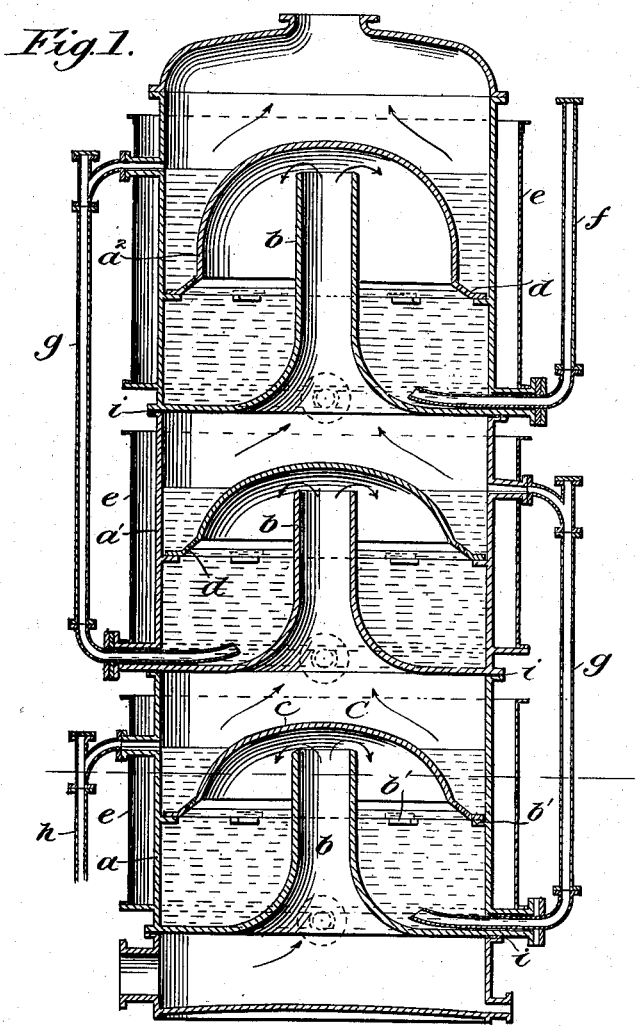
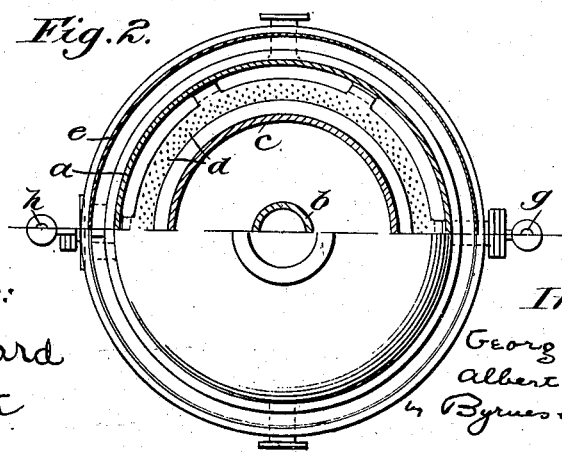
Witnesses:
N. P. Leonard
L. A. Potter
Inventors,
Georg Eschellmann
Albert Harmuth,
by Byrnes + Townsend,
Att'ys.

UNITED STATES PATENT OFFICE.

GEORG ESCHELLMANN AND ALBERT HARMUTH, OF ST. PETERSBURG, RUSSIA.

APPARATUS FOR ABSORPTION OF GASES.

No. 894,792.   Specification of Letters Patent.   Patented July 28, 1908.

Application filed July 27, 1907. Serial No. 385,934.

*To all whom it may concern:*

Be it known that we, GEORG ESCHELLMANN, a British subject, and ALBERT HARMUTH, a German subject, residing at St. Petersburg, Empire of Russia, have invented certain new and useful Improvements in Apparatus for the Absorption of Gases, of which the following is a specification.

The object of this invention is to provide an apparatus for the absorption of gases in suitable solvents, the apparatus being more particularly intended for the absorption of gaseous sulfuric anhydrid in a suitable liquid, usually sulfuric acid.

In the towers commonly employed heretofore for the absorption of sulfuric anhydrid, the current of the gaseous sulfur trioxid is brought into contact with the absorbing liquid by exposing an extended surface of the liquid to the gases by permitting it to flow downward over a filling material disposed within a vertically arranged tower, the current of gas rising through the same. Among the many disadvantages of this arrangement may be noted the tendency to the formation of channels through which the acid flows without contact with the gas; the great amount of space required for an installation capable of absorbing considerable quantities of sulfur trioxid; and the fact that it is impracticable to cool the absorbing liquid during the progress of the absorption, it being necessary to permit periods of absorption to alternate with cooling periods. Efforts to cool the absorbing liquid by applying cooling means to the tower have not been practically successful, since the cooling means cannot be effectively applied to the interior of the filling material or to the liquid itself, and the resulting complication of the apparatus is disproportionate to the results secured.

We have now found that the absorption of the gaseous sulfuric anhydrid may be quickly and effectively accomplished by conveying the gas under pressure through the absorbing liquid or acid. Equally favorable results cannot be secured by conveying the gases through the liquid by suction. Under a suitable pressure however an intimate contact may be secured between the gas and the liquid; by subdividing the gas at the same time into small bubbles, and by applying the cooling means at the surfaces of contact between the absorbing medium and the gas the conditions for rapid and complete absorption are fulfilled.

A form of apparatus constructed in accordance with our invention is shown in the accompanying drawing, wherein:

Figure 1 is a central vertical section of a preferred form of tower; and Fig. 2 is a plan view of the same, partly in horizontal section. Referring to the drawing, the absorption tower comprises a plurality of superposed absorption chambers $a, a', a^2$, shown as three in number, assembled in such manner that the packing is out of contact with the acid. Each chamber is provided with a centrally disposed, upwardly extending gas-inlet $b$, surmounted by an inverted bowl-shaped cover $c$, carried by supports $b'$ on the inner wall of the tower and making a substantially tight joint therewith. The outer and lower portion of each cover $c$ is preferably disposed at an angle to the tower walls, and this inclined portion is perforated as indicated at $d$, the perforations being preferably disposed in several rows and in staggered relation to each other as clearly indicated in Fig. 2. By means of these perforations the gases rising through the tower are distributed equally and in comparatively small bubbles around its circumference. The staggered arrangement of the perforations results in a more complete absorption of the gases, insuring that each gas bubble shall detach itself freely and rise to the surface of the liquid column without merging with the adjacent bubbles, thereby securing very rapid absorption. The arrangement also permits the gases to be completely absorbed in a liquid column of minimum height, and therefore in a column offering the minimum resistance to their passage. The lateral disposition of the perforations is also advantageous as preventing violent agitation of the liquid surface, and therefore avoiding the carrying of particles of the absorbing liquid from one compartment to that next above.

In order to secure the highest efficiency of absorption it is necessary that the cooling means should be applied directly to the absorption zone. This is accomplished in the apparatus shown by surrounding the several absorption chambers $a, a', a^2$ by cooling jackets $e$, and is aided by the inclined position of the perforated zone $d$ of the cover $c$, the inclination of this zone being such that the ascending absorbing liquid is directed outwardly as indicated by the arrows against the cooled walls. Preferably the cooling jackets $e$ extend not only around the absorption zone, but around the lower portions of the several chamber walls, as shown, in order that the absorbing liquid may be cooled during substantially its entire course.

As indicated in the drawing the cover $c$ in the upper chamber is preferably of greater depth than those in the other chambers, providing thereby a deeper liquid column, which is effective to absorb the final traces from the relatively dilute gases passing therethrough.

The smaller the perforations in the zones $d$, the more perfect will be the distribution of the gases and the more rapid their absorption. It is preferred that the size and number of the perforations should be such that their aggregate area will substantially equal the area of the gas-inlet, as a more certain distribution of the gases is thereby secured.

The absorbing acid may be introduced into the upper chamber through a pipe $f$, flowing upward through each chamber, and passing between the several chambers through connecting pipes $g$ extending between the upper portion of one chamber and the lower portion of the chamber next below. In this case the density of the acid overflowing from the lowermost chamber through the pipe $h$ will be controlled by the density of that introduced into the upper chamber through the pipe $f$. As an alternative arrangement each chamber may be provided with an independent inlet and outlet for acid, this arrangement possessing the advantage that it is possible to supply to the several chambers acids of a concentration adapted to secure the most effective absorption.

We claim:

1. An absorption apparatus comprising a plurality of absorption chambers adapted to contain an absorbing liquid, means for cooling the chamber walls, and means for directing the absorbing liquid against said cooled walls.

2. An absorption apparatus comprising a plurality of superposed absorption chambers, means for establishing an upward current of liquid in each of said chambers, means for distributing the gas in contact with said liquid, means for directing the absorbing liquid against the chamber walls, and means for cooling said walls.

3. An absorption apparatus comprising a plurality of superposed absorption chambers, a gas inlet for each chamber, a cover for each inlet directing the gas in proximity to the chamber walls, means for cooling said walls, perforations in said cover in proximity to said walls, and means for establishing an upward current of liquid through each of said chambers.

4. An absorption apparatus comprising a plurality of superposed absorption chambers provided with cooling jackets, a gas-inlet for each chamber, a cover for each inlet directing the gas in proximity to the chamber walls, perforations in said cover in proximity to said walls and inclined thereto, and means for establishing an upward current of liquid through each of said chambers.

5. An absorption apparatus comprising a plurality of superposed absorption chambers provided with cooling jackets, a central, upwardly-extending gas-inlet for each chamber, means for introducing gas under pressure to said chambers, a cover for each inlet directing the gas in proximity to the chamber walls, perforations in said cover in proximity to said walls and inclined thereto, and means for establishing an upward current of liquid through each of said chambers.

6. An absorption apparatus comprising a plurality of superposed absorption chambers provided with cooling jackets, a central, upwardly-extending gas-inlet for each chamber, means for introducing gas under pressure to said chambers, a cover for each inlet directing the gas in proximity to the chamber walls, a plurality of rows of staggered perforations in said cover in proximity to said walls and inclined thereto, and means for establishing an upward current of liquid through each of said chambers.

In testimony whereof, we affix our signatures in presence of two witnesses.

GEORG ESCHELLMANN.
ALBERT HARMUTH.

Witnesses:
N. D. FOMIN,
AUG. NIGHIS.